Dec. 17, 1929.  H. C. PRIVETT  1,739,984
HELICOPTER
Filed June 27, 1928  2 Sheets-Sheet 1
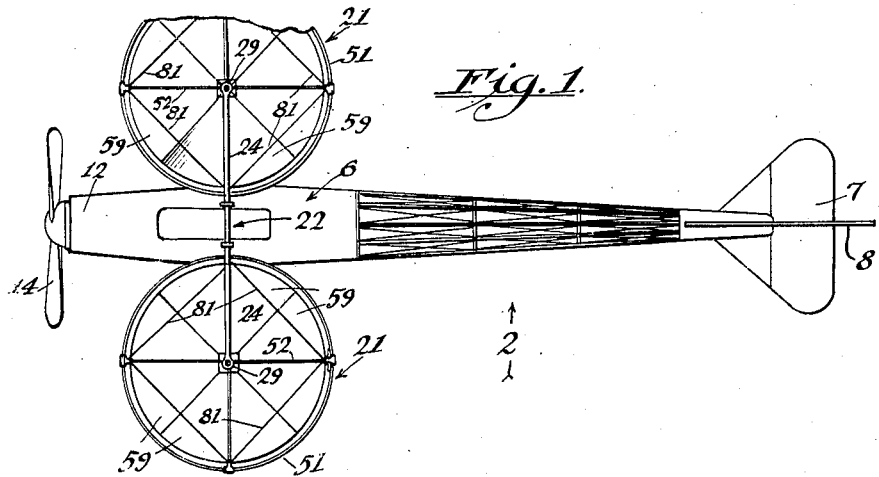
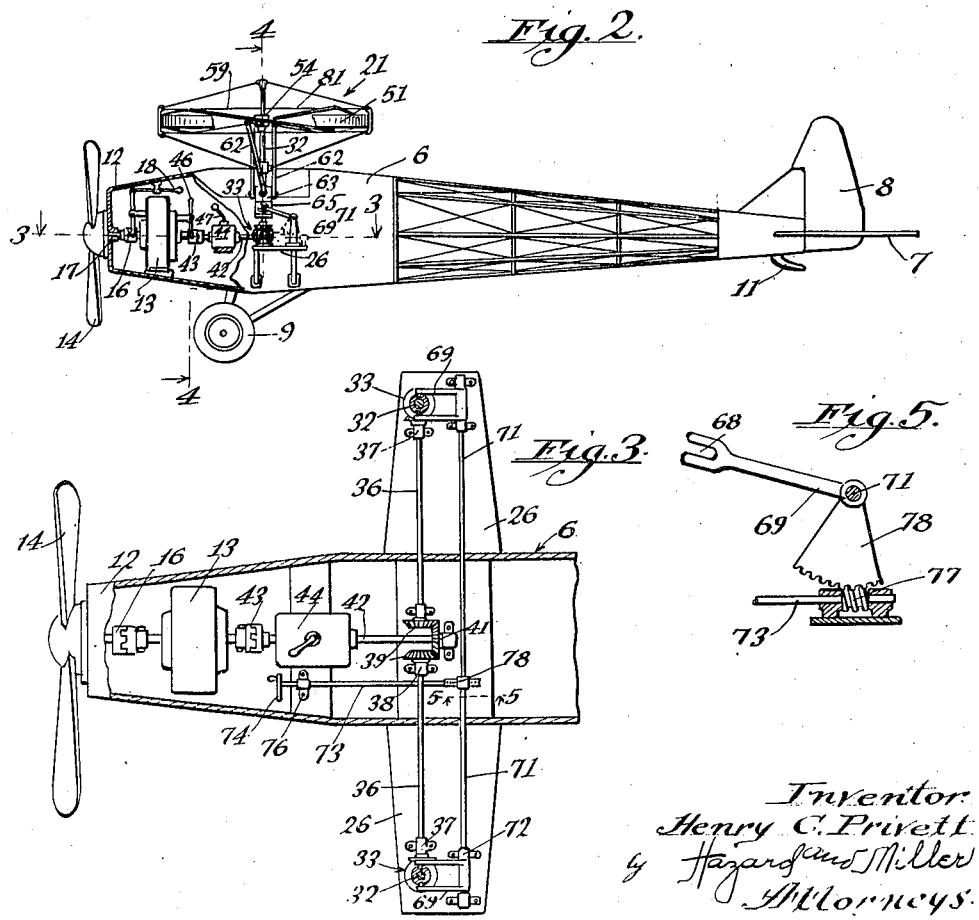
Inventor
Henry C. Privett
by Hazard and Miller
Attorneys Dec. 17, 1929.   H. C. PRIVETT   1,739,984
HELICOPTER
Filed June 27, 1928   2 Sheets-Sheet 2
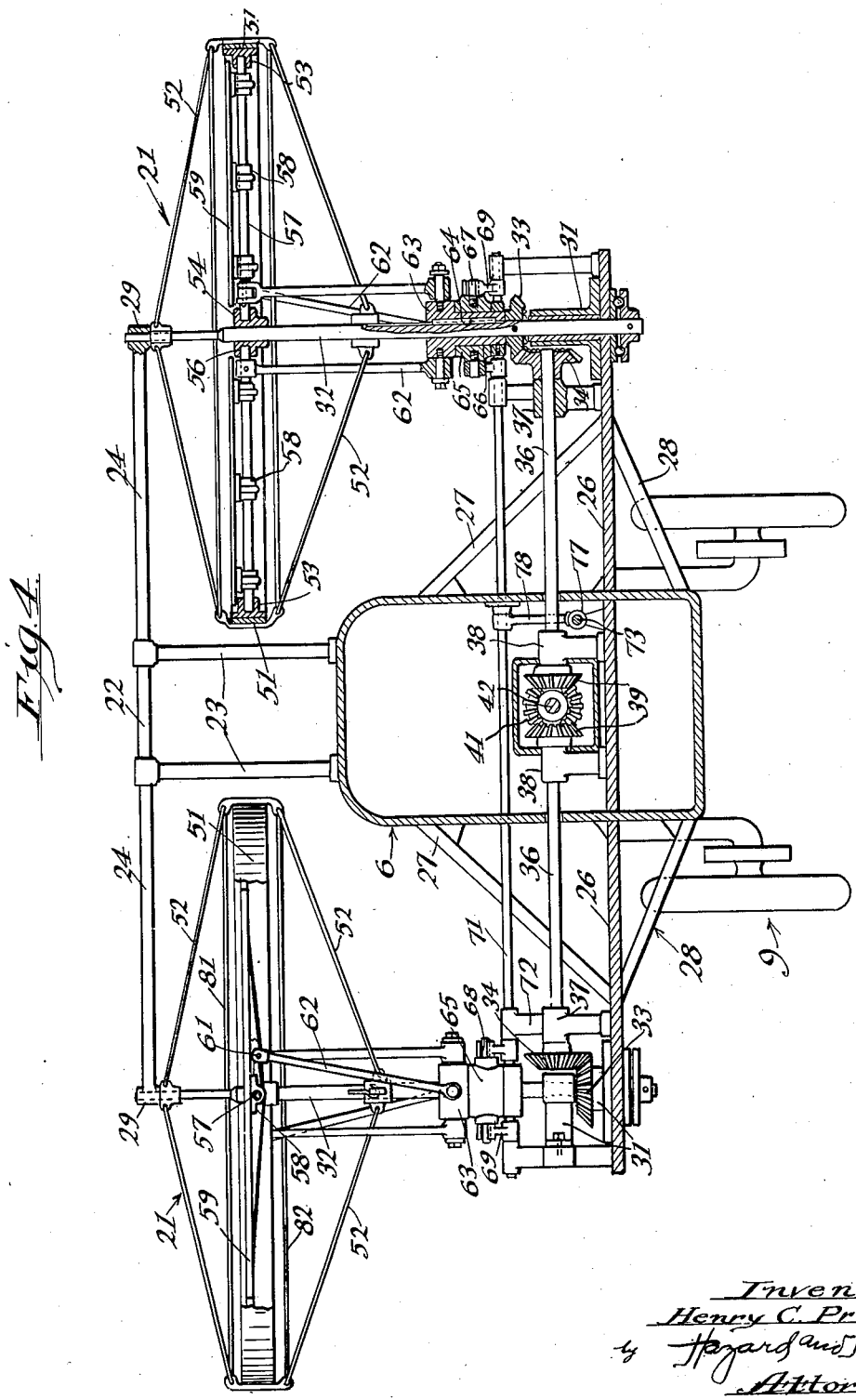

Patented Dec. 17, 1929

1,739,984

UNITED STATES PATENT OFFICE

HENRY C. PRIVETT, OF LOS ANGELES, CALIFORNIA, ASSIGNOR OF ONE-FOURTH TO ERNEST B. SWEETMAN, OF LOS ANGELES, CALIFORNIA

HELICOPTER

Application filed June 27, 1928. Serial No. 288,574.

This invention relates to air craft, and has for its object the provision of a combined airplane and helicopter.

A more detailed object of the invention is the provision of an air craft having one or more wings, each composed of a plurality of sections movable in respect to the other sections so that the sections of each wing can be arranged in a common plane or in angularity with the planes of the other sections of the same wing. Another object is the provision of a wing composed of sections as above described and which is adapted to be rotated about a central axis so that when the wing sections are disposed in angularity with each other the rotating wing may be utilized to lift the air craft straight from the ground without the necessity of any forward motion of the craft.

A still further object is the provision of driving an operating mechanism by means of which the wings may be driven and the wing sections moved during rotation of the wing from either of their two possible positions to the other to convert the air craft from an airplane to a helicopter and vice versa.

The invention possesses other objects and features of advantage, some of which, with the foregoing, will be set forth in the following description of the preferred form of my invention which is illustrated in the accompanying drawings forming part of the specification. It is to be understood that I do not limit myself to the showing made by the said drawings and description, as I may adopt variations of the preferred form within the scope of my invention as set forth in the claims.

Referring to the drawings;

Figure 1 is a top plan view of an air craft having the features of my invention incorporated therewith, a portion of the figure being broken away to reduce its size;

Fig. 2 is a side elevation, the direction of view being indicated by the arrow 2—2 of Fig. 1, and portions being broken away to better disclose the nature of the invention;

Fig. 3 is a horizontal sectional view of the forward portion of the craft. The plane of section is indicated by the line 3—3 of Fig. 2 and the direction of view by the arrows;

Fig. 4 is an enlarged transverse, vertical sectional view. The plane of section is indicated by the line 4—4 of Fig. 2 and the direction of view by the arrows;

Fig. 5 is an enlarged detail sectional view of a portion of the controlling mechanism. The plane of section is indicated by the line 5—5 of Fig. 3 and the direction of view by the arrows.

In terms of broad inclusion, the present invention contemplates the provision of a revoluble airplane wing composed of sections, each of which is movable in respect to the others so that the sections may be placed optionally in a single plane, permitting the wing to function as an ordinary airplane wing, or in angularity with each other with the leading edges of the sections higher than the trailing edges so that as the wing rotates it is capable of raising the craft straight from the ground. The invention also provides operating and controlling means requisite for the proper manipulation of the wing and its several sections.

The craft embodying the features of my invention is also to be supplied with a propeller, by means of which the craft may be driven after the fashion of the conventional airplane so that after the wing has been operated with its sections disposed angularly throughout a sufficient period to raise the craft off the ground, the propeller may be energized, after which the craft may be operated as an ordinary airplane. When it is desired to alight, the propeller may be thrown out of connection with the driving mechanism and the rotating wings again operated, but at reduced speed, so that the craft is permitted to settle slowly onto the ground or other surface. Hence, the provision of a large landing field is unnecessary because of the fact that the craft can take off from and alight upon relatively limited areas.

Specifically describing a preferred embodiment, the air craft of the present invention comprises a fuselage 6 of conventional design and having an elevator and rudder 7 and 8 respectively. The fuselage also carries landing gear 9 and a tail skid 11.

Mounted preferably adjacent the nose 12 of the fuselage 6 is a driving motor 13 of conventional design, which is operatively connected to a propeller 14 journaled preferably at the nose 12. A clutch 16 is interposed in the shaft 17 connecting the motor 13 and propeller 14, and the clutch 16 may be activated to selectively connect the propeller 14 to the motor 13 or disconnect them. An operating lever 18 accessible from the pilot's compartment, is operatively connected to the clutch 16 to effect such control.

The fuselage 6 is provided with preferably a pair of revolubly mounted wings 21. For their support a frame work 22 is provided, this frame work comprising vertical struts 23 supporting upper horizontal transverse members 24 and lower horizontal members 26 connected to the fuselage 6 by braces 27 and 28.

At each of the extremities of the upper transverse member 24 a journal 29 is provided; and aligned journals 31 are provided at the extremities of the lower transverse members 26. Within each aligned pair of journals 29 and 31 a shaft 32 is revolubly mounted; and each shaft 32 has rigidly attached thereto, preferably closely above the lower journal 31, a driven gear 33 which is enmeshed with a driving gear 34 carried by a driving shaft 36. Each of the driving shafts 36 is revolubly mounted in journals 37 and 38 supported preferably upon the lower transverse member 26 and is provided with a gear 39 at its inner end enmeshed with a gear 41. This last mentioned gear 41 is carried by a shaft 42 which is operatively connected to the motor 13 through a clutch 43 and variable speed transmission 44. Operating levers 46 and 47 are accessible from the pilot's compartment, by means of which the clutch 43 and transmission 44 respectively may be activated. As a result, for a single speed of the motor 13 the shaft 42 may be rotated at any one of a number of speeds or thrown entirely out of connection to the motor 13 and thus left motionless.

The shaft 32 of each of the wings 21 is provided with a rim 51 held rigidly in place by spokes 52. Each of the rims 51 is provided with preferably four sockets 53 upon its inner face; and a head 54 carried by the shaft 32 is provided with a similar number of sockets 56, each of which is in alignment with one of the sockets 53. A rod 57 is journaled in each aligned pair of sockets 53 and 56 for rotary movement about an axis extending radially from the shaft 32 to the rim 51.

Made fast to each of the rods 57 by brackets 58 or their equivalent is a sectoral vane 59. Preferably the vanes are all of similar configuration and are of such size that their edges are in abutment so that when the vanes 59 occupy a common plane the entire area within the rim 51 is filled. However, means are provided for inclining each of the vanes 59 so that each occupies a plane in angularity with those of the other vanes 59 of the same wing 21. Each vane 59 is provided with a pivot pin 61 offset from and parallel to its associated supporting rod 57; and carried by each of these pivot pins is a link 62. It is to be understood that all of the pivot pins 61 of each rim 51 are located upon the same side of their respective vane supporting rods 57 in respect to the direction of rotation of the wing. In the present embodiment the pivots 61 are positioned upon that side of the vane which trails during rotation of the wing.

All of the links 62 of each wing 21 are also connected to a common sleeve 63 which is splined to the associated vertical shaft 32 in any convenient manner such as by a feather 64. Thus it may be seen that by sliding the sleeve 63 upward upon the shaft 32 the vanes of the associated wing may be brought into a single plane to which the shaft 32 is perpendicular, and that by lowering the sleeve 63 on the shaft 32 the vanes may be brought into angularity with each other with the leading edge higher than the trailing edge so that as the wing 21 is rotated it will act as a propeller, revolving about a vertical axis coincident with the shaft 32, tending to lift the air craft straight from the ground.

Means for controlling the sleeve 63 and accordingly adjusting the vanes 59 are provided. A collar 65 is journaled within an annular groove 66 in each of the sleeves 63 and is provided with a pair of opposed and aligned pins 67 rigid therewith. The pins 67 project far enough from the sides of the collar 64 to be slidably received by slots 68 in the ends of arms 69, carried by an operating rod 71. This operating rod 71 is journaled in brackets 72 rigid with the lower frame member 26, and is offset from and parallel to the shaft 36 so that when the operating rod 71 is rotated through a relatively small arc the arms 69 will be swung to elevate or lower the sleeves 63 upon both of the shafts 32.

A shaft 73 carrying a hand wheel 74, accessible from the pilot's compartment, is journaled by brackets 76 in position to extend at right angles to the operating rod 71. The shaft 73 is provided with a worm 77 enmeshed with a sector shaped worm wheel 78 which is carried by the operating rod 71, so that when the hand wheel 74 is turned the shaft 71 will also be turned to move the vanes 59 in the direction determined by the direction of rotation of the hand wheel 74.

Means are provided for limiting the extent to which the vanes 59 may be moved from uniplanar arrangement. Preferably four rods 81, or their equivalent, extend across each of the wings 21 above the vanes 59, and four similar rods 82 across each wing below the vanes. These rods are carried by the associated rim 51, and are so spaced from a plane bisecting the rim and perpendicular to the axis of rotation thereof, that the vanes engage the rods when moved to the greatest desired degree of angularity.

In its preferable form, the gearing connecting the two wings 21 to the source of power is so arranged that the wings rotate in opposite directions, tending to neutralize the gyroscopic action of the wings which would otherwise tend to pull the air craft from a true course during flight.

In operation, it is intended that the air craft shall take off from the ground at the beginning of the flight with the clutch 16 disconnected so that the propeller 14 is motionless. The transmission 44 is set to such position that the wings 21 are rotated at their highest speed and then the clutch 43 is engaged to effect such rotation of the wings 21. Then, by operating the hand wheel 74 the wing vanes 59 should be moved to position of angularity with each other, with the result that the wings will act as horizontal propellers and lift the craft straight from the ground. When sufficient altitude has been attained, the clutch 16 should be engaged, effecting rotation of the propeller and consequent forward motion of the craft. The vanes 59 may then be moved into a common plane which is substantially horizontal, to permit the manipulation of the craft as a conventional airplane, it being understood that the rudder 8 and elevator 7 are to be employed during flight in the customary manner.

When it is desired to alight again, the propeller 14 should be stopped by disengaging the clutch 16, and the wings 21 again energized with the vanes 59 angularly disposed. Thus the craft may be supported in the air without any lateral movement, and by decreasing the speed of rotation of the wings 21 and/or the degree of angularity of the vanes, the craft may be permitted to settle gradually onto the ground or other surface. As a result of the fact that the craft comes straight down, the provision of a large landing field is unnecessary, as the craft is enabled to alight upon a comparatively restricted area.

I claim:

1. An air craft comprising a fuselage, a motor, driving means operably associated with said motor for propelling said craft horizontally, a frame work extending transversely of the fuselage, a vertically disposed shaft journaled at each end in said frame work and upon each side of the fuselage, a clutch and a variable speed transmission interposed between said shafts and the motor optionally to disconnect the shafts from the motor or connect them to the motor to be rotated thereby at selected speed, a rim carried by each of said shafts with the associated shaft normal to the plane thereof, a plurality of radiating rods, each journaled at one end upon the shaft and at the other end upon the rim, a sector shaped vane carried by each of said rods, a sleeve splined to the shaft, a link pivoted to each of said vanes at a point offset from its associated rod, all of said links being pivoted also to the sleeve, and means for sliding the sleeve upon the shaft.

2. An air craft comprising a fuselage, a motor, a propeller, a clutch interposed between the motor and the propeller optionally to connect or disconnect them, a frame work extending transversely of the fuselage, a vertically disposed shaft journaled at each end in said frame work and upon each side of the fuselage, a clutch and a variable speed transmission interposed between said shafts and the motor optionally to disconnect the shafts from the motor or connect them to the motor to be rotated thereby at selected speed, a rim carried by each of said shafts with the associated shaft normal to the plane thereof, a plurality of radiating rods, each journaled at one end upon the shaft and at the other end upon the rim, a sector shaped vane carried by each of said rods, a sleeve splined to the shaft, a link pivoted to each of said vanes at a point offset from its associated rod, all of said links being pivoted also to the sleeve, a collar journaled in a circumferential groove in said sleeve, an operating rod mounted for rotary movement, an arm carried by said operating rod, a pin rigid with said collar and slidable within a slot in said arm, and means for moving said operating rod to slide the sleeve upon the shaft to alter the angle of inclination of the vanes.

3. An air craft comprising a fuselage, a motor, a propeller, a clutch interposed between the motor and the propeller optionally to connect or disconnect them, a frame work extending transversely of the fuselage, a vertically disposed shaft journaled in said frame work upon each side of the fuselage, a clutch and a variable speed transmission interposed between said shafts and the motor optionally to disconnect the shafts from the motor or connect them to the motor to be rotated thereby at selected speed, a rim carried by each of said shafts with the associated shaft normal to the plane thereof, a plurality of radiating rods, each journaled at one end upon the shaft and at the other end upon the rim, a sector shaped vane carried by each of said rods, a sleeve splined to the shaft, a link pivoted to each of said vanes at a point offset from its associated rod, all of said links being pivoted also to the sleeve, means for sliding the sleeve upon the shaft to effect variation in the angular positioning of the vanes in respect to the plane of the associated wing, and rods extending across said rim as chords thereof adapted to engage the vanes and limit the angular displacement thereof.

4. An air craft comprising a fuselage, a motor, a framework extending transversely of the fuselage, a vertically disposed shaft journaled at each end in said framework and upon each side of the fuselage, a clutch and a variable speed transmission interposed between said shafts and the motor optionally to disconnect the shafts from the motor or connect them to the motor to be rotated thereby at selected speed, a rim carried by each of said shafts with the associated shaft normal to the plane thereof, a plurality of radiating rods, each journaled at one end upon the shaft and at the other end upon the rim, a sector shaped vane carried by each of said rods, a sleeve splined to the shaft, a link pivoted to each of said vanes at a point offset from its associated rod, all of said links being pivoted also to the sleeve, and means for sliding the sleeve upon the shaft.

In testimony whereof I have signed my name to this specification.

HENRY C. PRIVETT.